United States Patent [19]
Cahill

[11] Patent Number: 5,950,783
[45] Date of Patent: Sep. 14, 1999

[54] SELF ADJUSTING WRAP SPRING CLUTCH

[75] Inventor: Daniel Paul Cahill, Verona, Ky.

[73] Assignee: Lexmark International, Inc., Lexington, Ky.

[21] Appl. No.: 09/128,729

[22] Filed: Aug. 4, 1998

[51] Int. Cl.$^6$ .............................. F16D 11/06; B60K 41/24
[52] U.S. Cl. .................. 192/26; 192/128 A; 192/129 A; 192/12 BA
[58] Field of Search ................... 192/129 A, 26, 192/33, 128 A, 12 BA

[56] References Cited

U.S. PATENT DOCUMENTS

| | | | |
|---|---|---|---|
| 1,537,153 | 5/1925 | Stengel . | |
| 2,280,355 | 4/1942 | Spase et al. | 192/111 |
| 2,298,970 | 10/1942 | Russell et al. | 192/33 |
| 3,104,745 | 9/1963 | Wipke | 192/81 |
| 3,115,217 | 12/1963 | Butler | 188/73 |
| 3,529,703 | 9/1970 | Kroeker | 192/26 |
| 3,752,286 | 8/1973 | Sink | 192/111 A |
| 3,920,106 | 11/1975 | Nisenson | 192/33 C |
| 3,987,880 | 10/1976 | Holland-Letz et al. | 192/12 BA |
| 4,549,643 | 10/1985 | Flotow et al. | 192/111 A |
| 4,718,522 | 1/1988 | Frania et al. | 188/79.5 K |
| 4,760,903 | 8/1988 | Stegelmeier et al. | 192/26 |
| 5,090,530 | 2/1992 | Leone | 192/128 A |
| 5,090,538 | 2/1992 | Osawa | 192/84 T |
| 5,318,161 | 6/1994 | Lyga | 192/81 C |
| 5,325,950 | 7/1994 | Kimberlin | 192/415 |
| 5,335,760 | 8/1994 | Leone | 192/26 |

*Primary Examiner*—Charles A Marmor
*Assistant Examiner*—Tisha D. Waddell
*Attorney, Agent, or Firm*—John A. Brady

[57] ABSTRACT

A self-adjusting wrap spring clutch has a spring overlying driving and driven arbors and in engagement with each. One end of the spring is loosely connected to a control collar, which surrounds the spring and at least a portion of each of the arbors, while its other end is connected to the driven arbor. The control collar is held against rotation by a spring biased pawl engaging one of a plurality of preferably equiangularly spaced teeth on its circumference. When a solenoid is energized, the pawl is withdrawn from the tooth on the control collar and the spring tightens on the driving arbor to transmit torque to the driven arbor from the driving arbor. The pawl rides on a cam surface on a gear hub, which rotates whenever the driven arbor rotates, until the pawl falls into an opening or low dwell in the cam surface so that the pawl can engage one of the teeth on the control collar. Since the solenoid is deenergized shortly after energization, the pawl's engagement with the tooth stops rotation of the control collar to stop rotation of the driven arbor through holding the end of the spring so that it can no longer transmit torque to the driven arbor from the driving arbor.

16 Claims, 4 Drawing Sheets

SELF ADJUSTING WRAP SPRING CLUTCH

FIELD OF THE INVENTION

This invention relates to a self adjusting wrap spring clutch and, more particularly, to a wrap spring clutch in which there is automatic adjustment for both variations created during manufacture and for wear of parts of the clutch during use.

BACKGROUND OF THE INVENTION

A wrap spring clutch has a spiral spring surrounding or overlying two arbors, which are cylinders. One of the arbors continuously rotates and drives the other arbor when the spiral spring is held in engagement with the driving arbor. With the driving arbor continuously rotating, the wrap spring clutch is capable of starting and stopping the driven arbor intermittently. Two examples of wrap spring clutches are disclosed in U.S. Pat. No. 3,529,703 to Kroeker and U.S. Pat. No. 4,760,903 to Stegelmeier et al.

When the end of the spring wrapped around the driving arbor is held, the spring is forced to unwind and loosen its grip on the driving arbor. When this occurs, driving of the driven arbor ceases.

When the end of the spring wrapped around the driving arbor is released so as to be able to rotate with the driving arbor, the driving arbor rotates the spring to cause the driven arbor to rotate. The spring has its other end secured to the driven arbor so that it is wrapped down on the driven arbor at all times.

A slight variation in the diameter of the spring or a slight variation in the outer diameter of either or both of the two arbors can occur during manufacturing. To negate the effects of these manufacturing variations, wrap spring clutches have previously been manually adjusted. This adjustment has the potential of misadjustment at a later time to require repairs on the assembly line or in a customer's office.

Furthermore, wear of the wrap spring and the two mating arbors during use can require further adjustment to compensate for this wear. This is because wear increases the time for the clutch to engage.

SUMMARY OF THE INVENTION

The wrap spring clutch of the present invention avoids the need for manually adjusting for manufacturing variations by automatically compensating for such variations. It also automatically compensates for wear of the wrap spring and/or the mating arbors to eliminate the need for manual adjustment due to wear during use.

This is accomplished by disposing a control collar to surround or overlie the spring and at least a portion of each of the two arbors. The end of the spring surrounding or overlying the driving arbor is loosely connected to the control collar, preferably by being disposed in a slot in the circumference of the control collar and extending inwardly from one side thereof.

The control collar, which is coaxial with the two arbors, is held in a retained position so that it is prevented from rotating when the two arbors are not to be connected by the clutch. When the two arbors are to be connected so that an output shaft, which is connected to the driven arbor, is driven, control means is activated to release the control collar from its retained position.

The wrap spring clutch of the present invention also has a control arrangement for always stopping the driven arbor after it has completed a predetermined amount of rotation through stopping the control collar at a predetermined position. For example, the control collar is stopped after a single revolution or a portion of a revolution.

Therefore, the control arrangement for determining when the rotation of the control collar is stopped and held in its retained position compensates for any adjustment due to slight variations in the internal diameter of the spring and/or the outer diameter of either or both of the arbors.

Any slight variation in the diameter of the spring or either of the arbors due to wear during use is automatically compensated by the control collar rotating further until its rotation is stopped. Of course, this still results in only 360° of rotation, for example, of the driven arbor when there is compensation for wear.

An object of this invention is to provide an improved wrap spring clutch.

Another object of this invention is to provide a wrap spring clutch that automatically adjusts for both manufacturing variations and wear variations when they occur during use.

Other objects of this invention will be readily perceived from the following description, claims, and drawings.

BRIEF DESCRIPTION OF THE DRAWINGS

The attached drawings illustrate a preferred embodiment of the invention, in which.

DETAILED DESCRIPTION OF PREFERRED EMBODIMENT

Figure 1:
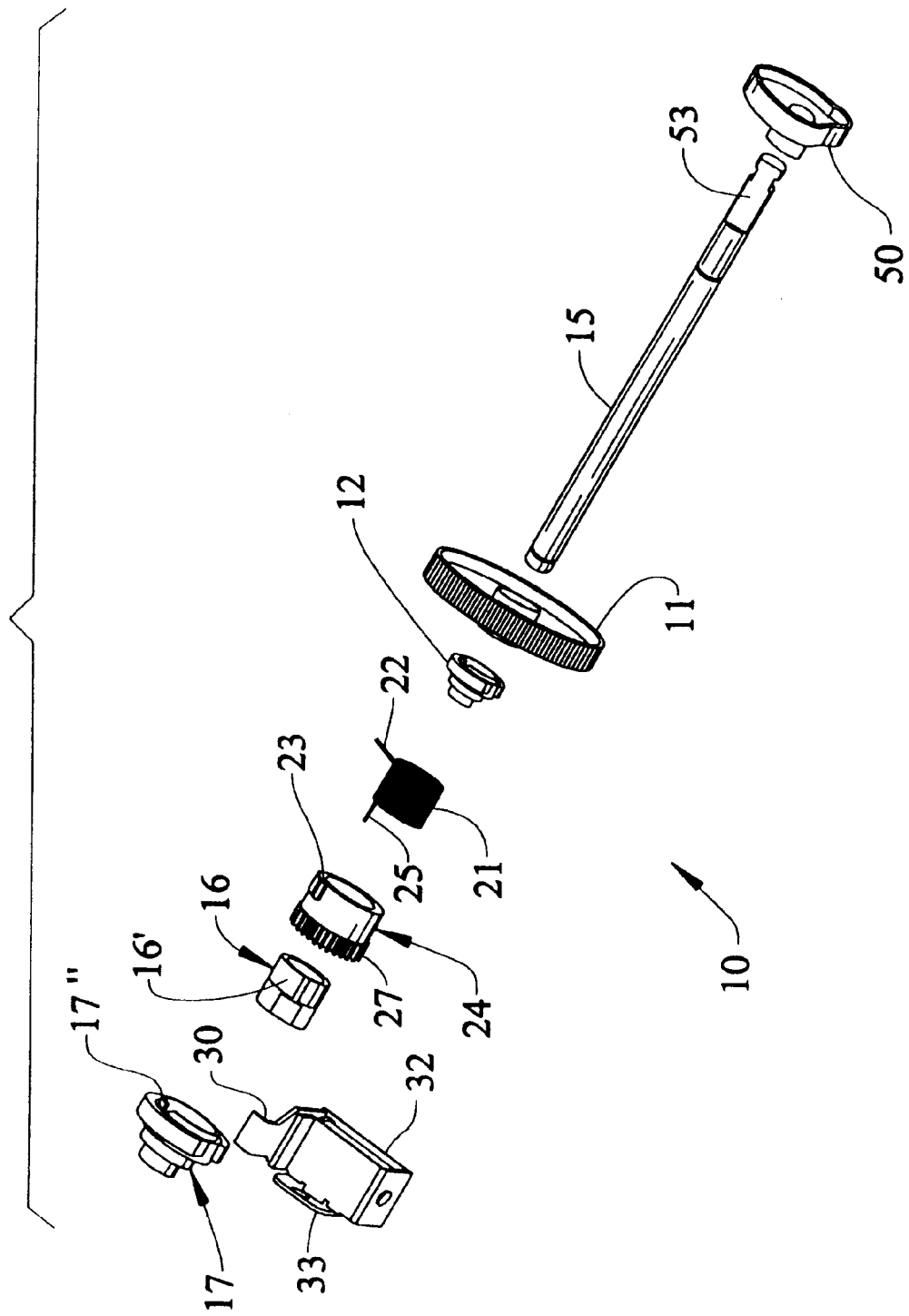
FIG. 1 is an exploded perspective view of a wrap spring clutch of the present invention.

Referring to the drawings and particularly FIG. 1, there is shown a wrap spring clutch 10 including a continuously driving gear 11, which is plastic, to which a driving input arbor 12, which is powdered metal, is attached. The driving gear 11 is driven by a motor (not shown) through a gear train (not shown).

The driving input arbor 12 is preferably press fitted onto a hub 14 (see FIG. 4) of the driving gear 11. The driving input arbor 12 and the hub 14 have engaging hexagonal shapes. Thus, the driving input arbor 12 rotates with the driving gear 11.

An output shaft 15 extends through the hub 14, a driven output arbor 16, and a plastic gear hub 17. The shaft 15, which is metal, has a clearance with each of the hub 14 of the driving gear 11 and the driven output arbor 16, which is powdered metal, although such clearance is not shown in FIG. 4.

The gear hub 17 has a flat 17' (see FIG. 3) on its inner surface 18 for cooperation with a flat 18' on the shaft 15. The driven output arbor 16 (see FIG. 4) has a flat 16' (see FIG. 1) on its outer surface 19 for cooperation with a flat (not shown) on inner surface 20 of the gear hub 17. Thus, the shaft 15, the driven arbor 16, and the gear hub 17 rotate together whenever the driven arbor 16 is driven.

A metallic spiral spring 21 overlies or surrounds a portion of the driving arbor 12 and a portion of the driven arbor 16. The inner diameter of the spiral spring 21 is slightly smaller than the outer diameter of each of the arbors 12 and 16 so that the spiral spring 21 continuously engages each of the arbors 12 and 16.

An end 22 (see FIG. 1) of the spiral spring 21 fits loosely in a slot 23 (see FIG. 2) in one end of a plastic control collar 24, which is coaxial with the driving arbor 12 (see FIG. 1), the output shaft 15, the driven arbor 16, and the gear hub 17. Control collar 24 functions in the standard manner to direct unwapping of spring 21 along the length of spring 21. The spiral spring 21 has its end 25 disposed in a slot (17") in the gear hub 17. End 25 in slot 17" assures that spring 21 will open sufficiently when end 22 is held against winding of spring 21 to prevent rubbing on arbors 12 and 16.

Figure 2:
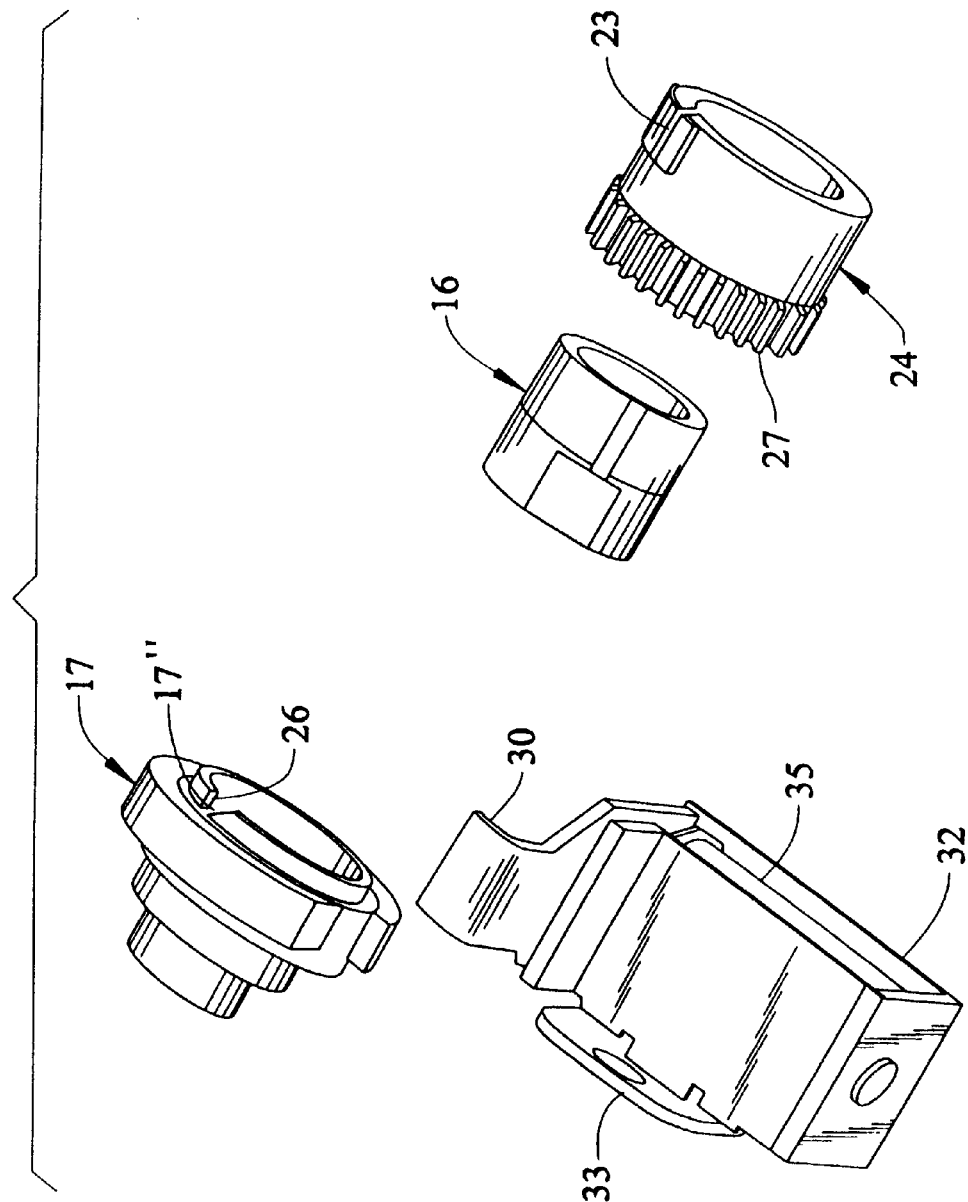
FIG. 2 is an enlarged exploded perspective view of portions of the wrap spring clutch of FIG. 1.

As shown in FIG. 2, the control collar 24 has teeth 27 on its end opposite the end having the slot 23 therein. The teeth 27 are preferably equiangularly spaced about the circumference of the control collar 24 although such is not a requisite for satisfactory operation. A pivotally mounted pawl 30 is continuously urged into engagement with one of the teeth 27 on the control collar 24 by a spring 31 (see FIG. 3).

Figure 3:
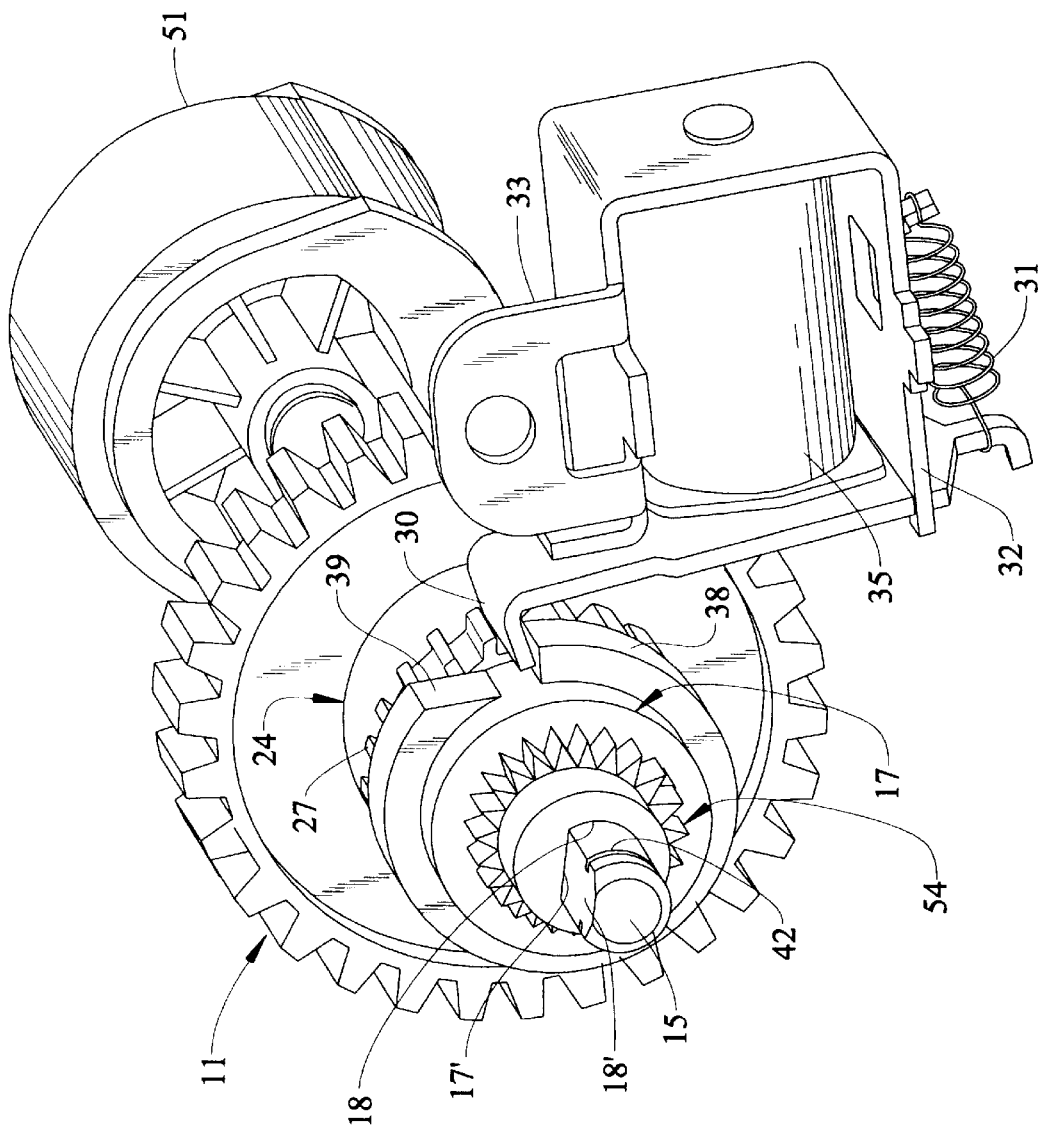
FIG. 3 is an enlarged perspective view of a portion of the wrap spring clutch of FIG. 1 and showing a camming surface for controlling when a pawl engages teeth on a control collar to disengage the clutch with teeth on a driving gear omitted.
Figure 4:
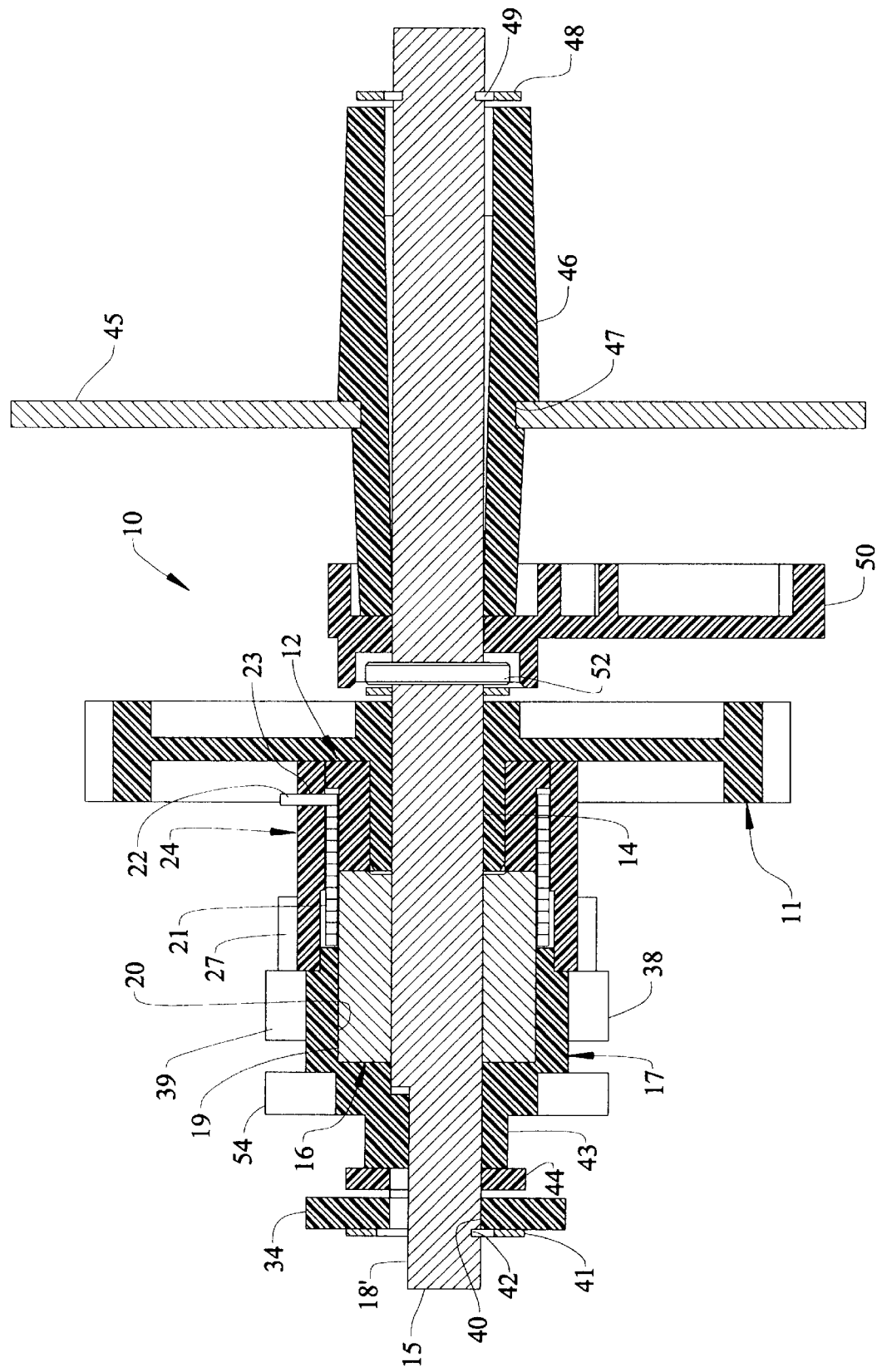
FIG. 4 is a longitudinal sectional view of a portion of the wrap spring clutch of the present invention.

The pawl 30 is pivotally supported by a support bracket 32, which has an ear 33 attached to a fixed frame 34 (see FIG. 4). A solenoid 35 (see FIG. 3) is mounted on the support bracket 32 so that energization of the coil of the solenoid 35 overcomes the force of the spring 31 and pulls the pawl 30 away from engagement with one of the teeth 27 on the control collar 24.

Accordingly, when the solenoid 35 is not energized, the control collar 24 is prevented from rotation by the pawl 30 engaging one of the teeth 27. When the solenoid 35 is energized, the pawl 30 is withdrawn from engagement with one of the teeth 27 so that the control collar 24 can rotate about its axis.

Therefore, when the pawl 30 is removed from engagement with one of the teeth 27 on the control collar 24, the spring 21 (see FIG. 4) wraps tightly around the driving arbor 12 and begins to rotate therewith. This rotation tightens spring 21 around driven arbor 16. Spring 21 then fits tightly over the driving arbor 12 and the driven arbor 16, transmitting the torque of the driving arbor 12 to the driven arbor 16 to rotate the driven arbor 16. Because the end 22 of the spring 21 is disposed in the slot 23 in the control collar 24, the control collar 24 rotates with the spring 21.

The solenoid 35 (see FIG. 3) is deenergized shortly after being energized. However, the pawl 30 cannot return into engagement with one of the teeth 27 on the control collar 24 until the pawl 30 moves off of a cam surface 38 into an opening or low dwell 39. Cam surface 38 is part of gear hub 17.

Because the cam surface 38 is integral with gear hub 17, the output shaft 15 will always be rotated the same amount during each cycle of operation before the pawl 30 can engage one of the teeth 27 on the control collar 24 to stop rotation of the driving arbor 16 (see FIG. 1). When this occurs, the end 22 of the spring 21 is again held since the control collar 24 cannot rotate. As a result of the end 22 of the spring 21 being loosely held in the slot 23 in the retained control collar 24, the spring 21 ceases to have sufficient engagement with the driving arbor 12 to rotate with the driving arbor 12 so that torque is not transmitted to the driven arbor 16.

One end of the shaft 15 extends through an opening 40 (see FIG. 4) in the frame 34 and is retained against axial motion by a C-clip 41. The C-clip 41 is disposed within a groove 42 in the shaft 15. The gear hub 17 has a reduced portion 43 engaging a spacer 44 on the opposite side of the frame 34 from the C-clip 41.

The shaft 15 also is supported by a fixed metal plate 45 through a plastic collar 46, which surrounds the shaft 15, having a groove 47 to receive the fixed plate 45. A C-clip 48 is disposed in a groove 49 in the shaft 15 for disposition adjacent the collar 46.

A plastic cam 50 (see FIG. 4) and a pick roll 51 (see FIG. 3) are supported on the shaft 15 for rotation therewith. The cam 50 (see FIG. 4 hidden behind gear 11 in FIG. 3), which is mounted on the shaft 15, is driven by the shaft 15 through a pin 52, which is attached to the shaft 15, engaging the cam 50 during rotation of the shaft 15. The pick roll 51 (see FIG. 3) is attached to the shaft 15 by a flat (not shown) on its inner surface cooperating with a flat 53 (see FIG. 1) on the shaft 15.

The cam 50 (see FIG. 4) cooperates with a spring loaded lift plate (not shown) supporting a stack of paper, for example, in a copier or printer to raise the stack of paper so that the pick roll 51 (see FIG. 3) transmits the rotation of the shaft 15 to the top sheet of the stack of paper.

The gear hub 17 has teeth 54 (see FIG. 3) for cooperation with a first set of teeth on a shaft of a damping gear (not shown), which is mounted on the frame 34. The damping gear has a second set of teeth (not shown) on its shaft rotating in a viscous material to dampen motions created by rotation of the shaft 15 through the spring loaded lift plate (not shown) via the cam 50.

Any slight variation in the internal diameter of the spring 21 (see FIG. 1), the outer diameter of the driving arbor 12, or the outer diameter of the driven arbor 16 will cause the spring 21 to wrap lesser or further around the driving arbor 12 to change the stop positions of the end 25 of the spring 21 along with the angular position of the gear hub 17, the shaft 15, and the pick roll 51 (see FIG. 3). Because the cam surface 38 on the gear hub 17 prevents the pawl 30 from engaging one of the teeth 27 on the control collar 24 until the opening or low dwell 39 in the cam surface 38 is reached, this position of the opening or low dwell 39 in the cam surface 38 corresponds to the prior adjustment position for variations in the internal diameter of the spring 21, the outer diameter of the driving arbor 12, and the outer diameter of the driven arbor 16.

Compensation for any variation in the inner diameter of the spring 21, the outer diameter of the driving arbor 12, or the outer diameter of the driven arbor 16 due to wear is provided by the control collar 24 rotating further until the pawl 30 falls off the cam surface 38 into the opening or low dwell 39. This falling off of the pawl 30 into the opening or low dwell 39 always occurs after the same amount of rotation of the shaft 15 even though the control collar 24 may have rotated further. This insures that the shaft 15 always returns to the same predetermined position.

When the control collar 24 rotates further due to wear, the pawl 30 will engage a different one of the teeth 27 than it did prior to the wear, for example. Therefore, by placing the teeth 27 relatively close to each other, very slight differences in rotation would occur before the next of the teeth 27 is engaged by the pawl 30.

While the wrap spring clutch 10 has been shown as having only the single opening or low dwell 39 in the cam surface 38, it should be understood that the cam surface 38 may have more than one of the openings or dwells 39, preferably equiangularly spaced from each other although such is not a requisite for satisfactory operation. Thus, while the shaft 15 makes a revolution during each cycle of operation with only the single opening or low dwell 39, additional openings in the cam surface 38 would result in the shaft 15 rotating a lesser, equal or unequal distance during each cycle of operation.

For example, if there were two of the openings or dwells 39 in the cam surface 38 spaced equal distances from each other, the shaft 15 would rotate 180° during each cycle of operation. If there were two of the openings or dwells 39 in the cam surface 38 spaced unequal distances from each other, the shaft 15 could rotate 175° and 185°, for example, during two cycles of operation, which constitute a revolution of the shaft 15. Therefore, the shaft 15 always returns to the next of the two predetermined positions when the cam surface 38 has two of the openings or dwells 39, for example. With three of the openings or dwells 39 in the cam surface 38, for example, there would be three predetermined positions at which the shaft 15 is stopped during a revolution.

An advantage of this invention is that manual adjustment of a wrap spring clutch is eliminated. Another advantage of this invention is that there is no requirement for an initial adjustment after manufacture or for repair during final assembly. A further advantage of this invention is that tolerances of the parts do not have to be as tight or close. Still another advantage of this invention is that its cost is lower than presently available wrap spring clutches.

For purposes of exemplification, a preferred embodiment of the invention has been shown and described according to the best present understanding thereof. However, it will be apparent that changes and modifications in the arrangement and construction of the parts thereof may be resorted to without departing from the spirit and scope of the invention.

What is claimed is:

1. A wrap spring clutch including:

a driving input arbor;

a driven output arbor coaxial with said input arbor;

a control collar coaxial with said input arbor and said output arbor, said control collar surrounding at least a portion of said input arbor;

a spring surrounding at least a portion of each of said input arbor and said output arbor;

said spring having one end connected to said control collar;

selective control means for selectively controlling said control collar to prevent and allow rotation of said control collar and said spring;

said spring wrapping around said input arbor and said output arbor to rotate said output arbor with said input arbor when rotation of said control collar is allowed by said selective control means;

and said selective control means including rotation sensing means for sensing the rotation of said output arbor for controlling when rotation of said control collar is stopped during each cycle of rotation of said control collar so that said output arbor is rotated a predetermined amount during each cycle of rotation.

2. The clutch according to claim 1 in which said selective control means includes:

rotation preventing means for preventing rotation of said control collar; and inactivating means for inactivating said rotation preventing means to allow rotation of said control collar so that said spring connects said input arbor to said output arbor to rotate said output arbor.

3. The clutch according to claim 2 in which:

said control collar has a plurality of angularly spaced teeth on its circumference;

and said rotation preventing means includes engaging means for engaging one of said teeth.

4. The clutch according to claim 3 in which said inactivating means includes withdrawal means for withdrawing said engaging means from engagement with one of said teeth on said control collar to allow rotation of said control collar and said spring.

5. The clutch according to claim 4 in which said rotation control means of said selective control means includes means rotatable with said output arbor for controlling when said engaging means returns into engagement with one of said teeth on said control collar.

6. The clutch according to claim 4 in which said rotation control means of said selective control means includes a cam surface rotatable with said output arbor for controlling when said engaging means returns into engagement with one of said teeth on said control collar, said cam surface having at least one low dwell to allow said engaging means to return into engagement with one of said teeth on said control collar.

7. The clutch according to claim 2 in which:

said control collar has a plurality of equiangularly spaced teeth on its circumference;

and said rotation preventing means includes engaging means for engaging one of said teeth.

8. The clutch according to claim 7 in which said inactivating means includes withdrawal means for withdrawing said engaging means from engagement with one of said teeth on said control collar to allow rotation of said control collar and said spring.

9. The clutch according to claim 8 in which said rotation control means of said selective control means includes means rotatable with said output arbor for controlling when said engaging means returns into engagement with one of said teeth on said control collar.

10. The clutch according to claim 8 in which said rotation control means of said selective control means includes a cam surface rotatable with said output arbor for controlling when said engaging means returns into engagement with one of said teeth on said control collar, said cam surface having at least one low dwell to allow said engaging means to return into engagement with one of said teeth on said control collar.

11. The clutch according to claim 2 in which said rotation control means of said selective control means includes means rotatable with said output arbor for controlling when said rotation preventing means is effective.

12. The clutch according to claim 2 in which said rotation control means of said selective control means includes a cam surface rotatable with said output arbor for controlling when said rotation preventing means is effective.

13. A wrap spring clutch including:

a continuously driving input arbor;

a driven output arbor coaxial with said input arbor;

a control collar coaxial with said input arbor and said output arbor, said control collar surrounding at least a portion of said input arbor;

said control collar having a plurality of angularly spaced teeth on its circumference;

a spring surrounding at least a portion of each of said input arbor and said output arbor;

said spring having one end loosely connected to said control collar;

said spring having its other end connected to said output arbor;

engaging means for engaging one of said teeth for preventing rotation of said control collar;

selective control means for selectively controlling said control collar to prevent and allow rotation of said control collar and said spring;

said spring connecting said input arbor to said output arbor to rotate said output arbor with said input arbor when rotation of said control collar is allowed by said selective control means;

and said selective control means including means rotatable with said output arbor for controlling when said engaging means returns into engagement with one of said teeth on said control collar during each cycle of rotation of said control collar so that said output arbor is rotated a predetermined amount during each cycle of rotation.

14. The clutch according to claim 13 in which said rotatable means of said selective control means is a cam surface rotatable with said output arbor and having at least one low dwell to allow said engaging means to return into engagement with one of said teeth on said control collar.

15. The clutch according to claim 14 in which said teeth on said control collar are equiangularly spaced.

16. The clutch according to claim 13 in which said teeth on said control collar are equiangularly spaced.

* * * * *